(12) United States Patent
Leach et al.

(10) Patent No.: US 10,593,442 B2
(45) Date of Patent: Mar. 17, 2020

(54) WINDING WIRE ARTICLES HAVING INTERNAL CAVITIES

(71) Applicant: Essex Group, Inc., Atlanta, GA (US)

(72) Inventors: Matthew Leach, Fort Wayne, IN (US); Christopher Richardson, Fort Wayne, IN (US)

(73) Assignee: Essex Group, Inc., Fort Wayne, IN (US)

(*) Notice: Subject to any disclaimer, the term of this patent is extended or adjusted under 35 U.S.C. 154(b) by 0 days.

(21) Appl. No.: 16/184,398

(22) Filed: Nov. 8, 2018

(65) Prior Publication Data

US 2019/0148037 A1 May 16, 2019

Related U.S. Application Data

(60) Provisional application No. 62/585,127, filed on Nov. 13, 2017.

(51) Int. Cl.
| | | |
|---|---|---|
| *H01B 7/42* | (2006.01) | |
| *H01B 7/00* | (2006.01) | |
| *H01B 7/02* | (2006.01) | |
| *H02K 3/22* | (2006.01) | |
| *H01B 3/30* | (2006.01) | |
| *H01B 1/02* | (2006.01) | |
| *H01B 1/18* | (2006.01) | |
| *H02K 3/12* | (2006.01) | |

(52) U.S. Cl.
CPC ............ *H01B 7/423* (2013.01); *H01B 7/0009* (2013.01); *H01B 7/0225* (2013.01); *H01B 7/0275* (2013.01); *H02K 3/22* (2013.01); *H01B 1/02* (2013.01); *H01B 1/18* (2013.01); *H01B 3/30* (2013.01); *H02K 3/12* (2013.01)

(58) Field of Classification Search
CPC ....... H01B 7/009; H01B 1/18; H01F 27/2823; H01F 27/24
See application file for complete search history.

(56) References Cited

U.S. PATENT DOCUMENTS

| | | |
|---|---|---|
| 5,201,903 A | 4/1993 | Corbett et al. |
| 8,881,806 B2 | 11/2014 | Xie et al. |
| 2011/0209894 A1 | 9/2011 | Williams et al. |
| 2016/0036277 A1* | 2/2016 | Lynch ...................... H02K 3/12 310/54 |
| 2016/0307664 A1 | 10/2016 | Obika et al. |
| 2017/0309373 A1 | 10/2017 | Tanaka et al. |
| 2018/0233998 A1* | 8/2018 | Lange ................. H02K 15/0414 |
| 2018/0254120 A1* | 9/2018 | Saito ......................... H01F 5/06 |

OTHER PUBLICATIONS

International Search Report, dated Feb. 4, 2019, for PCT/US2018/059836, filed on Nov. 8, 2018.

* cited by examiner

*Primary Examiner* — Timothy J Thompson
*Assistant Examiner* — Amol H Patel

(57) ABSTRACT

Winding wire articles may include a conductor formed into a predefined shape having at least one bend. Additionally, a plurality of cavities may be formed within the conductor. Insulation may also be formed around the conductor.

40 Claims, 11 Drawing Sheets

WINDING WIRE ARTICLES HAVING INTERNAL CAVITIES

CROSS-REFERENCE TO RELATED APPLICATION

This application claims priority to U.S. Provisional Application No. 62/585,127, filed Nov. 13, 2017 and entitled "Insulated Winding Wires and Winding Wire Articles Having Internal Cavities," the contents of which is incorporated by reference herein in its entirety.

TECHNICAL FIELD

Embodiments of the disclosure relate generally to articles formed from insulated winding wire and, more particularly, to winding wire articles that include internal cavities, voids, or inner-conductor spaces.

BACKGROUND

Magnetic winding wire, also referred to as magnet wire or insulated winding wire, is used in a multitude of devices that require the development of electrical and/or magnetic fields to perform electromechanical work. Examples of such devices include electric motors, generators, transformers, actuator coils, etc. Typically, magnet wire is constructed by applying electrical insulation to a metallic conductor, such as a copper, aluminum, or alloy conductor. Continuous magnet wire is sometimes cut and bent into predefined articles for incorporation into an electrical device. Conventional magnet wire conductors are typically formed from solid material, such as solid copper. The solid conductors increase the weight of the magnet wire and limit the operating performance due to heat buildup within the conductors. Accordingly, there is an opportunity to form magnet wire and magnet wire articles with unique conductor geometries. For example, there is an opportunity to form magnet wire articles with conductors that include internal cavities, voids, or inner-conductor spaces.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to articles, appliances, and/or assemblies formed from or incorporating winding wire or magnetic winding wire (hereinafter referred to as "magnet wire"). A magnet wire article may include a conductor and at least one layer of insulation formed around the conductor. A wide variety of suitable materials may be utilized to form the conductor and insulation around the conductor. Additionally, in accordance with an aspect of the disclosure, a plurality of cavities, voids, or inner-conductor spaces (hereinafter referred to as "cavities") may be formed in the conductor. The incorporation of cavities may reduce an amount of material incorporated into the article and, in certain embodiments, reduce the weight and/or the cost of the article relative to conventional magnet wire articles. As a result, the weight and/or cost of rotating electric machines (e.g., a motor, a starter generator, etc.) and/or other appliances incorporating the article may be reduced. Additionally, in certain embodiments, the use of one or more cavities may improve the heat transfer surface area of a conductor, thereby facilitating more effective cooling of the article and/or appliances incorporating the article.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
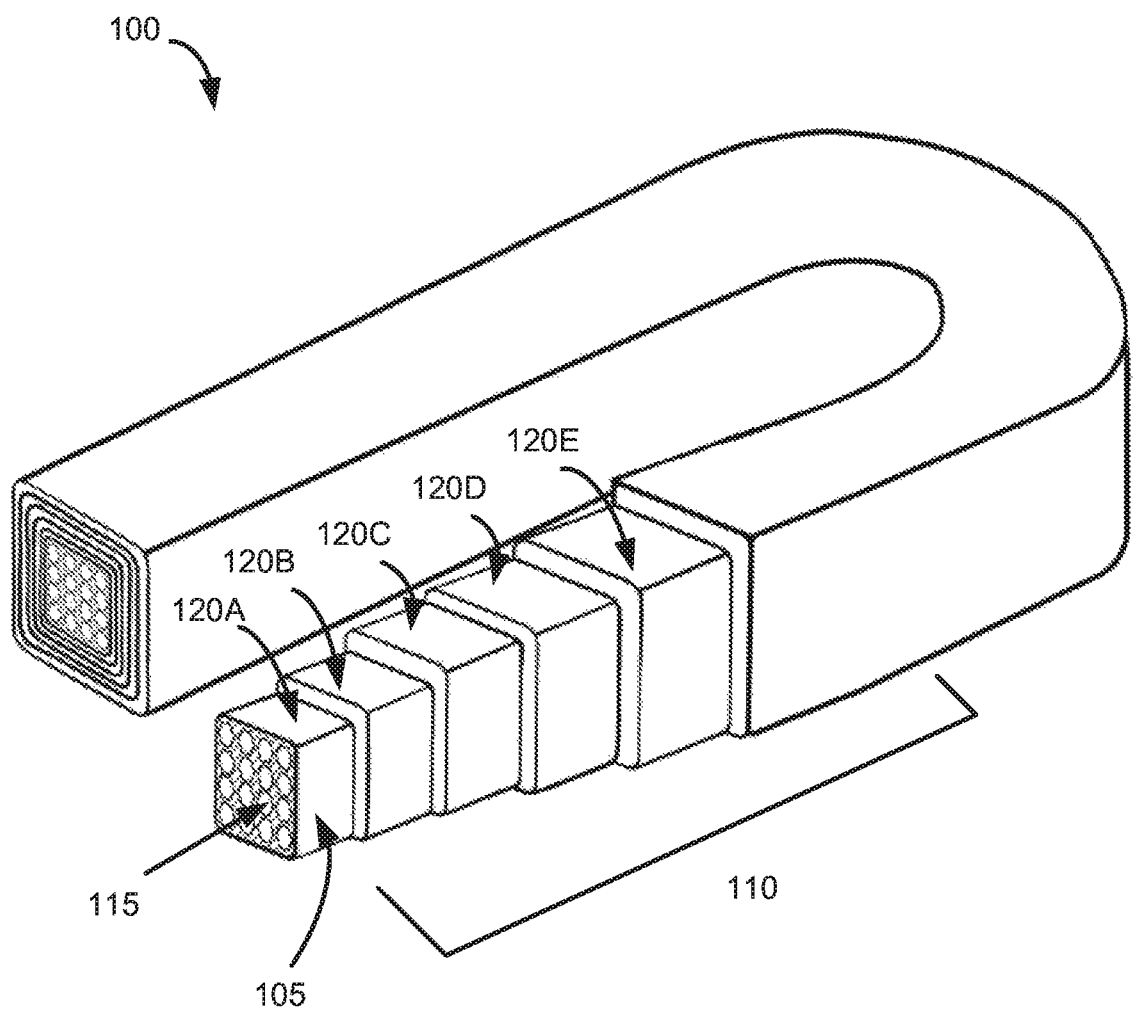
FIG. 1 is a perspective view of an example magnet wire article that includes a plurality of internal cavities, according to an illustrative embodiment of the disclosure.

With reference to FIG. 1, a perspective view of an example magnet wire article 100 is illustrated in accordance with an embodiment of the disclosure. The article 100 may include a central conductor 105 and any number of layers of insulation 110 formed around the central conductor 105. Additionally, according to an aspect of the disclosure, a plurality of cavities, voids, or inner-conductor spaces 115 may be formed within the conductor 105. As desired, the insulation 110 may include any number of sublayers, such as the five example sublayers 120A-E illustrated in FIG. 1, any subset of the illustrated sublayers, or any other suitable combination of sublayers. Each of the layers or components of the article 100 will now be described in greater detail.

According to an aspect of the disclosure, the article 100 may be formed with a predefined shape. For example, the article 100 may have a predefined shape that includes one or more bends or twists, including bends in the conical, radial, axial, and/or transverse directions that result in the article 100 having an overall shape other than that of a straight wire or a wire wrapped on a circular spool. In certain embodiments, the article 100 may include one or more relatively sharp or unsmooth bends. These bends may be formed for either assembly into an electrical device or to represent a final shape of an electrical device, and therefore, encompass a wide range of bends and/or twists to avoid contact and/or to maintain mechanical or electrical clearance with other wires or structures within a final design. For example, a bend may have a curvature greater than a curvature associated with or recommended for spooling magnet wire. In certain embodiments, the article 100 may include at least one bend that forms or approximately forms an angle. In other words, two portions of the article 100 may extend from either side of a bend in different directions. In the event that a bend forms or approximately forms an angle, a wide variety of suitable angles may be utilized. For example, a bend may have an angle of approximately 30°, 40°, 45°, 50°, 60°, 70°, 80°, 90°, 100°, 110°, 120°, 130°, 135°, 140°, 150°, 160°, 170°, 180°, an angle included in a range between any two of the above values, or an angle included in a range bounded on either a minimum or maximum end by one of the above values (e.g., an angle equal to or greater than approximately 90°, etc.). In other embodiments, the article 100 may include one or more twists. For example, the article 100 may be twisted or otherwise formed in a rotational direction (e.g., a clockwise or counter clockwise direction, etc.) relative to the longitudinal direction in which a wire extends. Any suitable twist rate may be utilized as desired.

The article 100 may be formed with one or more bends and/or twists that result in a wide variety of suitable shapes. In certain embodiments, as shown in FIG. 1, the article 100 may be formed as a hairpin having a "U" or an approximately "U" shape. For example, the article 100 may have a U-shaped end turn with two legs extending from the end turn. The term "U" shape is not intended to be limiting and may cover a wide variety of shapes including an end turn with legs extending from the end turn, such as a "V" shape or a "W" shape. As desired in various embodiments, the two legs may have either unequal or approximately equal lengths. In other embodiments, the article 100 may be formed to have a waveform shape. In other embodiments, the article 100 may be formed to have a bar shape for an electrical device winding. In certain embodiments, the wire of an article 100 may be shaped into an approximately triangular shape or an approximately trapezoidal shape to facilitate a final winding geometry or an interim assembly step. A few example shapes that may be utilized in association with articles are described in greater detail below with reference to FIGS. 6-9F.

As desired, one or more magnet wire articles (e.g., hairpins, bars, coils, etc.) may be incorporated into an appliance, such as a motor, starter, generator, or other rotating electric machine. In various embodiments, the cavities formed in articles may reduce the weight of the appliance, facilitate heat transfer within the appliance, facilitate cooling of the appliance, and/or facilitate circulation of a cooling fluid within the appliance.

The conductor 105 may be formed from a wide variety of suitable materials or combinations of materials. For example, the conductor 105 may be formed from one or more metallic materials (e.g., copper, aluminum, annealed copper, oxygen-free copper, silver-plated copper, nickel plated copper, copper clad aluminum ("CCA"), silver, gold, nickel, stainless steel, a conductive alloy, a bimetal, etc.), carbon nanotubes ("CNTs"), one or more polymer composites containing CNTs, one or more metal composites containing CNTs, graphene, one or more polymer composites containing graphene, one or more metal composites containing graphene, one or more semi-conductive materials, and/or any other suitable electrically conductive material. The conductor 105 may be formed from a single material (e.g., a copper conductor, etc.) or from a plurality of different materials. For example, the conductor 105 may be formed with two layers of material, such as an outer layer formed around an inner or core layer. In various embodiments, example conductors may be formed with two metallic layers (e.g., aluminum over copper, etc.), with a metallic layer formed over a layer of CNTs, etc. In yet other embodiments, the conductor 105 may be formed with one or more outer conducting layers (e.g., copper, etc.) formed around a dielectric core or inner layer. A few non-limiting examples of conductor constructions are described in greater detail below with reference to FIGS. 4A-4F.

The conductor 105 may be formed with any suitable cross-sectional shape. As shown in FIG. 1, the conductor 105 may have a rectangular cross-sectional shape. However, as explained in greater detail below with reference to FIGS. 3A-3F, the conductor 105 may be formed with a wide variety of other cross-sectional shapes, such as a square, circular, elliptical, oval, hexagonal, octagonal, or other shape. As desired, the conductor 105 may have corners that are rounded, sharp, smoothed, curved, angled, truncated, or otherwise formed. Additionally, the conductor 105 may be formed with any suitable dimensions. For example, a rectangular conductor may have longer sides between approximately 0.050 inches and approximately 5.0 inches and shorter sides between approximately 0.015 inches and approximately 5.0 inches. An example square conductor may have sides between approximately 0.30 inches and approximately 5.0 inches. An example round conductor may have a diameter between approximately 0.050 inches and approximately 5.0 inches. Other suitable dimensions may be utilized as desired, and the described dimensions are provided by way of example only. In certain embodiments, the conductor 105 may have any suitable cross-sectional area, such as a cross-sectional area between approximately 0.00070 in$^2$ and approximately 25 in$^2$. As desired, the dimensions of various conductors having a wide variety of cross-sectional shapes may be sized to provide a desirable cross-sectional area.

FIG. 1 illustrates an article 100 that includes a plurality of layers of insulation 110 formed around the conductor 105. Any number of layers of insulation, types of insulation, and/or any combination of layers of insulation may be formed around the conductor 105. For example, the insulation 110 may include one or more enamel layers, one or more layers of extruded polymeric material, one or more conformal layers, one or more tapes or wraps, one or more other dielectric layers, one or more layers of semi-conductive material, etc. In certain embodiments, each insulating layer or sublayer of an insulation system may be formed from the same materials. For example, different enamel layers may be formed from the same polymeric material. In other embodiments, at least two insulating layers or sublayers may be formed from different materials. For example, different enamel layers may be formed from different polymeric materials. As another example, extruded insulation may be formed over one or more layers of enamel.

The article 100 of FIG. 1 is illustrated with a plurality of insulation layers 120A-E formed concentrically around the conductor 105. For example, a plurality of enamel layers 120A-C may be formed around the conductor 105, an extruded layer 120D may be formed around the enamel layers 120A-C, and a conformal layer 120E may be formed around the extruded layer. A few non-limiting examples of conductors formed with different types of insulation and/or combinations of insulation layers are described in greater detail below with reference to FIGS. 2A-2E. Any of the example constructions illustrated in FIGS. 2A-2E may be utilized with the article 100.

Figure 2A:
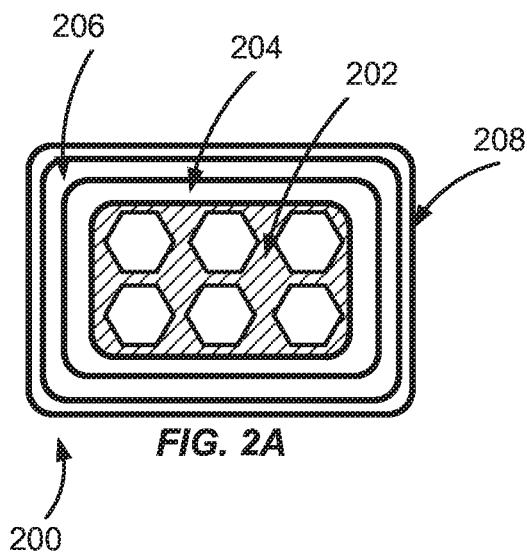
FIGS. 2A-2E are cross-sectional views of example magnet wire article constructions that include various types of insulation layers, according to illustrative embodiments of the disclosure.

In certain embodiments, the insulation 110 may include one or more layers of enamel (e.g., enamel layers 120A-C). FIG. 2A illustrates an example article 200 in which a plurality of layers of enamel 204, 206, 208 are formed on a conductor 202. An enamel layer is typically formed by applying a polymeric varnish to the conductor 105 (or another underlying layer) and then baking the conductor 105 in a suitable enameling oven or furnace. As desired, a plurality of layers of enamel may be applied to the conductor 105 in order to achieve a desired enamel thickness or build. Additionally, each layer of enamel and/or a total enamel build may have any desired thickness.

A wide variety of different types of polymeric materials may be utilized to form an enamel layer. Examples materials include, but are not limited to, polyimide, polyamideimide, amideimide, polyester, polyesterimide, polysulfone, polyphenylenesulfone, polysulfide, polyphenylenesulfide, polyetherimide, polyamide, one or more suitable thermoset materials, etc. In certain embodiments, an enamel layer may be formed as a mixture of two or more materials. Further, different enamel layers may be formed from the same material(s) or from different materials. As desired, one or more suitable filler materials and/or additives may be incorporated into an enamel layer. Examples filler materials include, but are not limited to, inorganic materials such as metals, transition metals, lanthanides, actinides, metal oxides, and/or hydrated oxides, nitrates, sulfides, phosphates, silicates, or chlorides of suitable materials such as aluminum, tin, boron, germanium, gallium, lead, silicon, titanium, zinc, yttrium, vanadium, zirconium, nickel, etc.; suitable organic materials such as polyaniline, polyacetylene, polyphenylene, polypyrrole, other electrically conductive particles; and/or any suitable combination of materials. The filler material(s) may enhance the corona resistance of the enamel and/or the overall insulation system. In certain embodiments, the filler material(s) may also enhance one or more thermal properties of the enamel and/or overall insulation system, such as temperature resistance, cut-through resistance, and/or heat shock. The particles of a filler material may have any suitable dimensions, such as any suitable diameters, and any suitable blend or mixture ratio between filler material and enamel base material may be utilized.

In certain embodiments, the insulation 110 may include one or more suitable wraps or tapes, such as a polymeric tape, a Kapton tape, etc. As desired, additional materials or additives may be incorporated into, embedded into, or adhered to a tape. A tape may include a wide variety of suitable dimensions, such as any suitable thickness and/or width. Additionally, a tape may be wrapped around the conductor 105 at any angle along a longitudinal direction or length of the conductor.

Figure 2B:
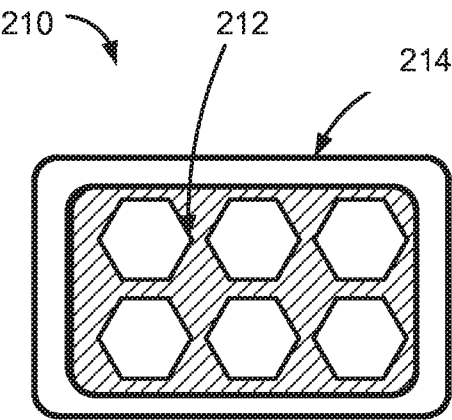
Figure 2C:
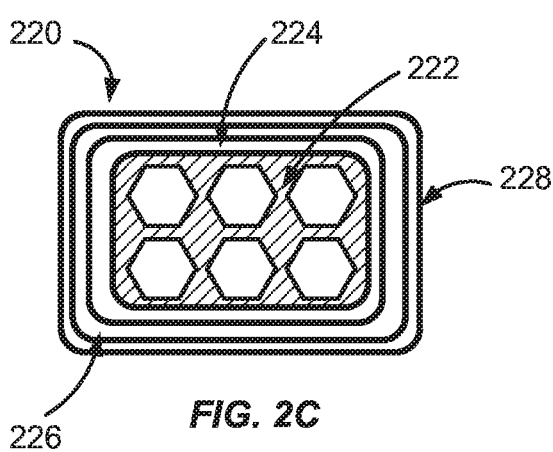

In other embodiments, the insulation 110 may include one or more layers of extruded material (e.g., extruded layer 120D). As desired, extruded layer(s) may be formed directly on the conductor 105 or, alternatively, over one or more underlying layers (e.g., one or more enamel layers, etc.). FIG. 2B illustrates an example article 210 in which an extruded layer 214 is formed directly on a conductor 212. FIG. 2C illustrates an example article 220 in which one or more enamel layers 224, 226 are formed around a conductor 222, and then one or more extruded layers 228 are formed around the enamel layer(s) 224, 226.

In certain embodiments, an extruded layer may be formed from a suitable thermoplastic resin. A wide variety of suitable materials may be incorporated into a resin or into a plurality of resins utilized to form extruded layers. Examples materials include, but are not limited to, polyether-etherketone ("PEEK"), polyaryletherketone ("PAEK"), polyetheretherketoneketone ("PEEKK"), polyetherketoneketone ("PEKK"), polyetherketone ("PEK"), polyetherketoneketoneetherketone ("PEKKEK"), polyketone ("PK"), any other suitable material that includes at least one ketone group, thermoplastic polyimide ("PI"), aromatic polyamide, aromatic polyester, polyphenylene sulfide ("PPS"), materials that combine one or more fluoropolymers with base materials, any suitable thermoplastic material, etc. In other embodiments, one or more thermoset materials (e.g., polyimide, polyamideimide, etc.) may be paste-extruded at relatively high temperature in order to form an extruded insulation layer. Additionally, in certain embodiments, a single extruded layer may be formed. In other embodiments, a plurality of extruded layers may be formed. If a plurality of layers is utilized, the extruded layers may be formed from the same material or, alternatively, at least two layers may be formed from different materials. An extruded layer may also be formed with any suitable thickness. In certain embodiments, an extruded layer may be formed directly on the conductor 105 or an underlying layer (e.g., an enamel layer, etc.). In other embodiments, one or more suitable bonding agents, adhesion promoters, or adhesive layers may be incorporated between the extruded layer and an underlying conductor 105 or layer. In yet other embodiments, a conductor or insulation layer (e.g., enamel layer, etc.) may be treated via one or more suitable techniques including, but not limited to, plasma, corona, flame, and/or ion treatments, to improve bonding and adhesion of a subsequently formed insulation layer.

Figure 2D:
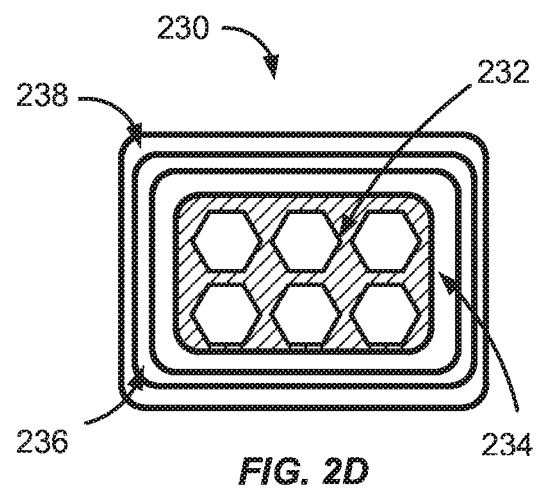

In certain embodiments, the insulation 110 may include one or more layers of conformal material, such as one or more outermost conformal layers (e.g., 120E). In certain embodiments, one or more conformal layers may be formed directly around a conductor 105. In other embodiments, one or more conformal layers may be formed around one or more base or other insulating layers. FIG. 2D illustrates an example article 230 in which base insulation (e.g., enamel, extruded insulation etc.) 234 is formed around a conductor 232, and a plurality of conformal layers 236, 238 are formed as outermost insulating layers. As desired, an adhesion promotor may optionally be applied to an underlying layer (e.g., a conductor, base insulation, etc.) prior to the formation of a conformal layer. Any number of conformal layers may be formed, and each conformal layer may consist of a relatively thin polymeric film that conforms to the contours of an underlying article or an appliance incorporating an article.

A wide variety of suitable materials may be utilized to form a conformal layer, such as one or more parylene or parylene containing materials, one or more acrylic materials, one or more epoxy materials, polyurethane, silicones, polyimides, fluoropolymers, etc. In the event that a plurality of conformal layers are formed, each conformal layer may be formed from the same material or at least two conformal layers may be formed from different materials (e.g., different parylene materials, etc.). As desired, one or more intervening layers may be positioned between two conformal layers, such as an adhesive layer or layer containing one or more adhesion promotors. A conformal layer may also be formed with any suitable thickness, such as a thickness as thin as approximately several hundred angstroms to as thick as approximately 200 μm. Additionally, a conformal coating may be applied utilizing a wide variety of techniques, such as chemical vapor deposition. The conformal layer(s) may eliminate and/or reduces defects, faults, voids, pinholes, and/or exposed portions of a conductor 105, thereby improving the electrical performance and/or life cycle of the article 100. Additionally, the conformal layer(s) may promote resistance of oxidation, humidity, chemicals, oils (e.g., transmission fluid, etc.), and/or ultraviolet ("UV") light. Conformal layer(s) may also provide a lower coefficient of friction, thereby allowing an article 100 to be more readily incorporated into an appliance.

Figure 2E:
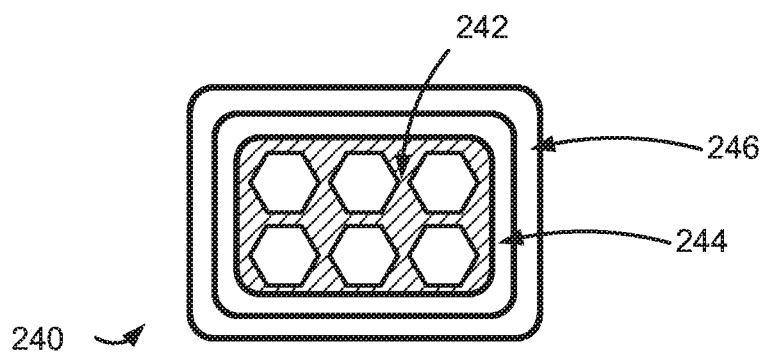

In certain embodiments, one or more semi-conductive layers may be incorporated into the article 100. For example, one or more semi-conductive layers may be formed on the conductor 105 and or incorporated into the insulation 110. FIG. 2E illustrates an example article 240 in which a semi-conductive layer 244 is formed around a conductor 242. Additional insulation 246 (e.g., one or more enamel layers, one or more extruded layers, one or more conformal layers, etc.) may then be formed on the semi-conductive layer 244. A semi-conductive layer may have a conductivity between that of a conductor and an insulator. A semi-conductive layer may be formed from a wide variety of suitable materials and/or combinations of materials. For example, one or more suitable semi-conductive enamels, extruded semi-conductive materials, semi-conductive tapes, and/or semi-conductive wraps may be utilized. In certain embodiments, a semi-conductive layer may be formed from a material that combines one or more suitable filler materials with one or more base materials. For example, semi-conductive and/or conductive filler material may be combined with one or more base materials. Examples filler materials include, but are not limited to, suitable inorganic materials such as metallic materials and/or metal oxides (e.g., zinc, copper, aluminum, nickel, tin oxide, chromium, potassium titanate, etc.), and/or carbon black; suitable organic materials such as polyaniline, polyacetylene, polyphenylene, polypyrrole, other electrically conductive particles; and/or any suitable combination of materials. The particles of the filler material may have any suitable dimensions, such as any suitable diameters. Examples base materials include, but are not limited to, polyimide, polyamideimide, amideimide, polyester, polyesterimide, polysulfone, polyphenylenesulfone, polysulfide, polyphenylenesulfide, polyetherimide, polyamide, thermoplastic materials, etc. Any suitable blend or mixture ratio between filler material and base material may be utilized. Additionally, a semi-conductive layer may have any suitable thickness. As a result of incorporating one or more semi-conductive layers into the article 100, non-uniform electric, magnetic, and/or electromagnetic fields (hereinafter collectively referred to as electric fields) may be equalized or "smoothed out", thereby reducing local stress in the insulation and improving electrical performance. In other words, one or more semi-conductive layers may assist in equalizing voltage stresses in the insulation and/or dissipating corona discharges.

As set forth above, any combination of layers and/or materials may be utilized to form the insulation 110. Additionally, the insulation 110 (and/or any sublayers) may be formed with any desired concentricity, which is the ratio of the thickness of a layer to the thinness of the layer at any given cross-sectional point along a length of the article 100. In certain embodiments the insulation 110 and/or any sublayer may be formed with a concentricity less than or equal to approximately 1.1, 1.2, 1.3, 1.4, 1.5, or any other suitable value. Additionally, the insulation 110 may have any desired overall thickness. As desired, the insulation 110 may be formed from one or more materials and/or layers that have any number of desirable properties, such as dielectric constant "$\varepsilon$" (e.g., a dielectric constants below approximately 5.0, 4.5, 4.0, 3.75, 3.5, 3.25, 3.0, etc. at approximately 25° C.), a desired National Electrical Manufacturers Association ("NEMA") thermal class or rating (e.g., a rating of A, B, F, H, N, R, S, or higher), a desired partial discharge inception voltage ("PDIV"), a desired dielectric strength, a desired cut-through value, etc.

According to an aspect of the disclosure, a plurality of cavities 115, voids, or inner-conductor spaces (referred to generally as "cavities") may be formed in or incorporated into the article 105. Each cavity 115 may be formed as a space within the conductor 115 that is not occupied by conductive material. Any number of cavities may be incorporated into a conductor 115 as desired in various embodiments. In certain embodiments, a plurality of cavities may be incorporated into a conductor 115 at any given cross-sectional location. In other embodiments, a plurality of adjacent longitudinally spaced cavities may be incorporated into the conductor 115 with a single cavity at each given cross-sectional location. In yet other embodiments, a single cavity, such as a single longitudinally extending cavity, may be incorporated into a conductor 115. As explained in greater detail below, a wide variety of cavity configurations may be utilized in various embodiments.

Each cavity 115 may be formed with any suitable cross-sectional shape. As shown in FIGS. 1-3F, one or more cavities may be formed with a hexagonal cross-sectional shape. As shown in FIGS. 4A-4F, cavities may be formed with square or rectangular cross-sectional shapes. In various embodiments, cavities 115 may be formed with rectangular, square, hexagonal, octagonal, circular, semicircular, quarter-circular, elliptical, triangular, polygonal, wavy, sinusoidal, or any other suitable cross-sectional shape. As desired, a cavity 115 may have one or more corners or edges that are straight, rounded, sharp, smoothed, curved, angled, truncated, or otherwise formed. A few example cavity cross-sectional shapes and example cavity configurations are described in greater detail below with reference to FIGS. 5A-5I.

Each cavity 115 may also be formed with a wide variety of suitable cross-sectional dimensions. For example, a cavity 115 may be formed with any suitable cross-sectional height, width, radius, diameter, major axis, minor axis, and/or other suitable dimensions. For example, a cavity 115 having a rectangular cross-sectional shape may have a width between approximately 0.030 inches and approximately 4.990 inches, and the cavity 115 may have a height between approximately 0.005 in and approximately 4.990 inches. As another example, a cavity 115 having a circular cross-sectional shape may have a diameter between approximately 0.005 inches and approximately 4.990 inches. As yet another example, a cavity 115 having a hexagonal cross-sectional shape may have a maximum diameter between approximately 0.003 inches and approximately 4.990 inches. In various embodiments, a cavity 115 may have a cross-sectional dimension (e.g., height, width, diameter, axis, etc.) of approximately 0.005, 0.010, 0.015, 0.020, 0.025, 0.030, 0.040, 0.050, 0.060, 0.070, 0.080, 0.090, 0.10, 0.20, 0.25, 0.30, 0.40, 0.50, 0.60, 0.70, 0.80, 0.90, 1.0, 1.10, 1.20, 1.25, 1.30, 1.40, 1.50, 1.60, 1.70, 1.80, 1.90, 2.0, 2.10, 2.25, 2.30, 2.50, 2.75, 3.0, 3.25, 3.50, 3.75, 4.0, 4.25, 4.5, 4.75, 4.90, 4.95, or 4.99 inches, a value included in a range between any two of the above values, or a value included in a range bounded on either a minimum or a maximum end by one of the above values. Additionally, a cavity 115 may be formed with any suitable cross-sectional area. For example, a cavity 115 may have a cross-sectional area of approximately, 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.010, 0.015, 0.020, 0.025, 0.030, 0.035, 0.040, 0.045, 0.050, 0.060, 0.0625, 0.0650, 0.070, 0.075, 0.080, 0.090, 0.10, 0.15, 0.20, 0.25, 0.30, 0.35, 0.40, 0.45, 0.50, 0.60, 0.65, 0.70, 0.75, 0.80, 0.85, 0.90, 1.0, 1.1, 1.15, 1.20, 1.25, 1.30, 1.40, 1.50, 1.60, 1.70, 1.75, 1.80, 1.90, 2.0, 2.1, 2.2, 2.25, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.25, 4.50, 4.75, 5.0, 5.5, 6.0, 6.5, 7.0, 7.5, 8.0, 8.5, 9.0, 10.0, 11.0, 12.0, 13.0, 14.0, 15.0, 16.0, 17.0, 18.0, 19.0, 20.0, 21.0, 22.0, 23.0, 24.0, 24.5, or 24.9 square inches, an area included in a range between any two of the above values, or an area included in a range bounded on either a minimum or a maximum end by one of the above values.

A cavity 115 may be formed with any suitable longitudinal length along the longitudinal dimension of the article 105. In certain embodiments, one or more cavities 115 may be continuous along a longitudinal length of the article 105. In other embodiments, one or more cavities 115 may have longitudinal lengths that are less than the longitudinal length of the article 105. For example, a plurality of cavities 115 may be positioned adjacent to one another (e.g., end to end, etc.) along a longitudinal length of the article 105 with conductive material (or other solid material) positioned between longitudinally adjacent cavities. In yet other embodiments, at least one first cavity may be longitudinally continuous, and at least one second cavity may have a longitudinal length that is less than that of the conductor 105.

Each cavity 115 may also be formed with any suitable internal volume. In certain embodiments, a cavity 115 may be formed as an open or hollow cavity within the conductor 115. In other words, the cavity 115 may be free of internal support structures and/or other components of the article 100. In other embodiments, one or more elements may be positioned within a cavity 115, such as one or more spokes, crosspieces, support structures, spines, etc. In certain embodiments, one or more elements positioned within a cavity 115 may be formed from the same material(s) as the conductor 105. In other embodiments, one or more elements may be formed from one or more other materials, such as dielectric materials, semi-conductive materials, etc.

In certain embodiments, each of the cavities 115 incorporated into a magnet wire may have similar dimensions. For example, each cavity may have a similar cross-sectional shape, cross-sectional dimension(s), and/or longitudinal length. In other embodiments, at least two cavities may have one or more different dimensions. For example, two cavities may have different cross-sectional shapes, cross-sectional dimension(s), and/or longitudinal lengths.

A wide variety of cavity configurations may be utilized as desired in various embodiments. For example, as shown in FIG. 1, a plurality of hexagonal cavities 115 may be positioned in order to form a honeycomb structure or arrangement within the conductor 105. As other examples, a plurality of cavities 115 having any suitable cross-sectional shapes may be arranged in any number of rows, columns, arrays, grids, and/or in a wide variety of suitable patterns. In certain embodiments, each of the cavities 115 positioned at a given cross-sectional point along the conductor 105 may have similar dimensions. In other embodiments, at least two cavities may have one or more dimensions that differ from one another. For example, at least two cavities may have different cross-sectional shapes and/or cross-sectional dimensions (e.g., widths, heights, diameters, etc.). Additionally, in certain embodiments, a plurality of cavities 115 may be arranged such that an internal lattice or support structure is formed within the conductor 105. For example, one or more spines, vertical elements, cross-beam elements, diagonal elements, and/or other support elements may be defined by the plurality of cavities 115 within the conductor 105. A few non-limiting examples of configurations for cavities are illustrated and described in greater detail below with reference to FIGS. 5A-5I.

Each cavity 115 may be filled with one or more gases (e.g., air, nitrogen, helium, a cooling gas, a mixture of gases, etc.), liquids (e.g., refrigerant, cooling liquid, deionized water, coolants, etc.), dielectric material, or other suitable substance(s). For example, a gas or mixture of gases having a desired thermal conductivity, such as a thermal conductivity estimated using the Chapman-Enskog model, may be selected. As another example, one or more cavities 115 may be filled with a suitable refrigerant or cooling liquid, such as water, glycols, one or more dielectric fluids, etc. Additionally, in certain embodiments, a substance (e.g., air, etc.) may be permitted to freely migrate within the cavities 115. In other embodiments, the article 100 may be connected to one or more suitable circulation systems that facilitate flow of a cooling substance through the article 100.

In certain embodiments, at least one cavity 115 may be formed as a longitudinally continuous cavity or channel through the conductor 105 that facilitates convective cooling and/or cooling via recirculation within the at least one cavity 115. As an example of convective cooling, as portions of the conductor 105 and/or article 100 heat up, the fluid (e.g., gas, liquid, etc.) within the at least one cavity 115 may transfer heat from the relatively warmer or hotter portions along the longitudinal length of the article 100. In certain embodiments, the convective heat transfer may occur based primarily on temperature fluctuations within the article 100 and/or the at least one cavity 115. In other embodiments, one or more external fans may facilitate gas flow through the at least one cavity 115. As yet another example, one or more external pumping systems, compressors, refrigeration systems, etc. may facilitate the flow of cooling gas and/or liquid through the at least one cavity 115. As desired, one or more fluid diverting end caps and/or other suitable components may be utilized to facilitate the recirculation of fluids (e.g., gases, liquids, etc.) through a plurality of cavities 115.

As desired, an internal surface of one or more cavities 115 (e.g., a single cavity formed in a conductor 105, a plurality of cavities formed in a conductor 105, one or more of a plurality of cavities formed in a conductor 105, etc.) may be coated or lined with one or more layers that promote or facilitate use of a cooling fluid or substance that might normally break down, degrade, or damage the conductor 105. A wide variety of suitable materials and/or combinations of materials may be utilized to form a lining on a surface of a cavity 115. Example materials include, but are not limited to, one or more polymeric materials (e.g., polyethylene, polyether-ether-ketone ("PEEK"), polyaryletherketone ("PAEK"), polyetheretherketoneketone ("PEEKK"), polyetherketoneketone ("PEKK"), polyetherketone ("PEK"), polyetherketoneketoneetherketone ("PEKKEK"), polyketone ("PK"), any other suitable material that includes at least one ketone group, thermoplastic polyimide ("PI"), aromatic polyamide, aromatic polyester, polyphenylene sulfide ("PPS"), materials that combine one or more fluoropolymers with base materials (e.g., materials that include at least one ketone group, etc.), polyolefines, any suitable thermoplastic material, etc., parylene, polyimide, polyurethane, or any other suitable thermoset material, etc.), one or more epoxy materials (e.g., glycidyl and non-glycidyl based resins, etc.), and/or one or more inorganic compounds (e.g., silicone, zinc, tungsten carbide, Inconel, Nitride, zirconium, aluminum, flexible ceramics, etc.). The cavity lining may be formed from a single layer of material or from a plurality of layers of material. Different layers of a multi-layer cavity lining may be formed from the same material(s) or, alternatively, at least two layers may be formed from different materials. Additionally, a cavity lining may be formed with any suitable thickness. For example, a cavity lining may be formed with a thickness of approximately 0.001, 0.002, 0.003, 0.004, 0.005, 0.006, 0.007, 0.008, 0.009, 0.01, 0.015, 0.02, 0.025, 0.03, 0.035, 0.04, 0.05, 0.06, 0.07, 0.075, 0.08, 0.085, 0.09, 0.095, or 0.10 inches, a thickness included in a range between any two of the above values, and/or a thickness included in a range bounded on either a minimum or maximum end by one of the above values.

A cavity lining may permit use of a wide variety of suitable cooling fluids and/or substances within an article 100 or appliance incorporating the article 100. Example cooling fluids and/or substances include, but are not limited to, ethylene glycol, propalyne glycol, ammonia, one or more refrigerants, oil, alcohol, hydrogen, argon, nitrogen, air, carbon dioxide, supercritical carbon dioxide ("$SCO_2$"), methane, liquid methane, toluene, water, and/or any other suitable coolants. The lining may prevent or reduce the likelihood of the cooling fluids or substances degrading or breaking down the conductor 105. Additionally, the lining may facilitate avoidance of the use of specialized fluids, such as copper compatible coolants, that may conventionally be used within conductors. For example, the lining may allow the avoidance of specialized fluids such as deionized water, etc. Additionally, the cavity lining may facilitate the use of cooling fluids that enhance or more directly cool the conductor 105 relative to conventional substances and/or designs. As a result, more effective cooling may be conducted and resistive heating losses may be reduced, thereby improving efficiency, costs, and/or power density of the article 100 and/or components incorporating the article 100.

A wide variety of suitable methods and/or techniques may be utilized to form, produce, or otherwise provide a conductor 105 and/or article 100 incorporating cavities 115. In certain embodiments, an article 100 having cavities may be formed via 3D printing or additive manufacturing. Rather than a magnet wire being cut and shaped to form articles, one or a plurality of articles (e.g., hairpins, etc.) may be produced utilizing additive manufacturing. For example, a plurality of articles may be produced in parallel via a plurality of 3D printing devices. Similarly, portions or all of an electrical appliance (e.g., a motor, etc.) may be formed via additive manufacturing. A wide variety of suitable 3D modeling packaging may be utilized to create or model any number of magnet wire article or other designs, such as Solidworks, Autodesk, Inventor, Creo, etc. Additionally, a wide variety of suitable additive manufacturing techniques and/or combinations of techniques may be utilized. Example additive manufacturing techniques include, but are not limited to, material extrusion, fused deposition modeling ("FDM"), material jetting, binder jetting, sheet lamination, powder bed fusion (e.g., direct metal laser sintering ("DMLS"), electron beam melting ("EBM"), selective heat sintering ("SHS"), selective laser melting ("SLM"), selective laser sintering ("SLS"), etc.), direct energy deposition, etc. The use of additive manufacturing may facilitate the production of any number of unique geometries, shapes, and/or constructions of magnet wire articles.

Once a conductor 105 is created utilizing additive manufacturing, a wide variety of suitable techniques may be utilized to form insulation. In certain embodiments, additive manufacturing may be used to also form or deposit insulation material on a conductor 105. In other embodiments, insulation 110 may be formed via electrostatic coating, vapor deposition (e.g., vapor deposition of conformal coatings, etc.), electroplating, extrusion, application of material via one or more dies, application of material via one or more brushes or rollers, etc. As desired, applied insulation may be cured or cross-linked utilizing thermal curing, ultraviolet ("UV") curing, radiation curing, microwave curing, electron beam curing, and/or any other suitable curing technique(s).

As an alternative to forming a conductor 105 with cavities 115 utilizing additive manufacturing, in other embodiments, a conductor 105 having a plurality of cavities may be formed via an injection molding process. Once the conductor 105 is formed, insulation 110 may be applied via any suitable process, such as any of the processes discussed above. In other embodiments, a conductor 105 may be extruded via a suitable conform or continuous extrusion process such that the conductor 105 includes cavities 115. For example, the conductor 105 may be extruded through one or more suitable dies or other structures that result in the formation of cavities 115. After conform extrusion of the conductor 105, insulation 110 may be formed on the conductor 105 via any number of suitable techniques. In yet other embodiments, a conductor 105 may be drawn or pulled through a rod mill in a manner that forms cavities 115. As desired, one or more flatteners and/or rollers may be used to modify the cross-sectional shape of the conductor 105 or conductor input material (e.g., rod stock, etc.) before and/or after drawing. Other suitable formation techniques may be utilized in other embodiments. In certain embodiments, the conductor 105 may be formed in tandem with the application of a portion or all of the insulation 110. In other embodiments, a conductor 105 may be preformed or obtained from an external source. Insulation 110 may then be applied or otherwise formed on the conductor 105.

The incorporation of cavities 115 into a conductor 105 may reduce an amount of material incorporated into the article 100. A reduction of material may reduce the overall cost and/or weight of the article 100 relative to conventional magnet wire articles. As a result, the weight of appliances (e.g., rotating electric machines, motors, etc.) incorporating the article 100 may be reduced. In certain embodiments, the use of cavities 115 may improve the heat transfer surface area of a conductor 105, thereby facilitating more effective cooling of the article 100 and/or appliances incorporating the article 100. In other words, the incorporation of cavities 115 may enhance a rate of heat transfer cooling by creating a larger conductor surface area. The cavities 115 may also facilitate convective heat transfer within a conductor 105 via temperature normalization along a length of the conductor and/or circulation of one or more cooling fluids through the conductor 105. Enhanced heat transfer and/or cooling may improve the efficiency of the article 100 and/or appliances incorporating the article 100.

An article 100 incorporating cavities 115 may be engineered to have a wide variety of suitable electrical performance properties, such as any suitable dielectric strengths, PDIVs, and/or thermal ratings. In certain embodiments, an article 100 may have a dielectric strength in excess of approximately 7,000, 9,000, 10,000, 11,000, 12,000, 13,000, 14,000, 15,000 volts per mil, or higher. In certain embodiments, an article 100 may have a PDIV greater than a desired threshold value, such as approximately 750, 800, 900, 1,000, 1200, 1,300, 1,500, 1,700, 2,000, 2,500 volts, or higher. An article 100 may also be engineered to have a wide variety of thermal ratings, such as a thermal rating that permits relatively continuous (e.g., a time period such as 1,000, 5,000, or 20,000 hours, etc.) use at temperatures up to approximately 180° C., 200° C., 220° C., 240° C., or higher without degradation of the insulation. An article 100 formed in accordance with embodiments of the disclosure may also be suitable for a wide variety of applications. For example, the article 100 may be suitable for use in automobile motors, starter generators for hybrid electric vehicles and/or electric vehicles, alternators, etc.

The article 100 described above with reference to FIG. 1 is provided by way of example only. A wide variety of alternatives could be made to the illustrated article 100 as desired in various embodiments and as discussed with reference to FIGS. 2A-5I. Indeed, the present disclosure envisions a wide variety of suitable article constructions in which cavities are incorporating into a conductor. These constructions may include a wide variety of suitable insulation systems, conductor shapes, conductor materials, and/or cavity configurations.

As set forth above, an article (e.g., the article 100 of FIG. 1) may be formed with a wide variety of suitable cross-sectional shapes. FIGS. 3A-3F illustrate example cross-sectional shapes that may be utilized for an article. Although the shapes in FIGS. 3A-3F are illustrated as conductor shapes, it will be appreciated that similar shapes and/or outer peripheries may be utilized for various insulation layers. Additionally, it is noted that each of the conductors illustrated in FIGS. 3A-3F includes a plurality of hexagonal cavities, such as cavities positioned in a honeycomb arrangement. In other embodiments, any suitable arrangement or configuration of cavities may be used with any of the conductors, for example, any of the cavity arrangements illustrated in FIGS. 5A-5I.

Figure 3A:
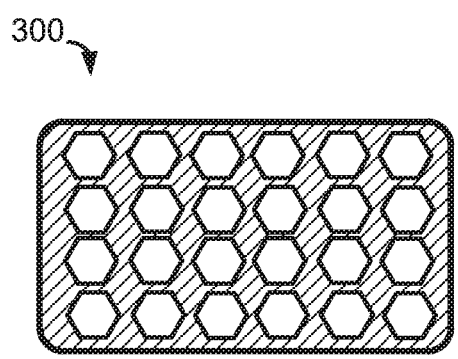
FIGS. 3A-3F illustrate example cross-sectional shapes that may be utilized for magnet wire articles in accordance with various embodiments of the disclosure.
Figure 3B:
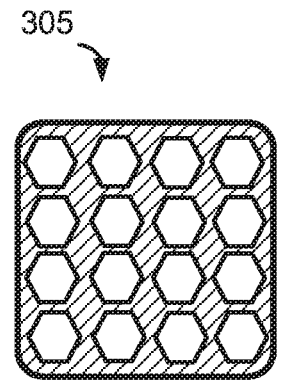
Figure 3C:
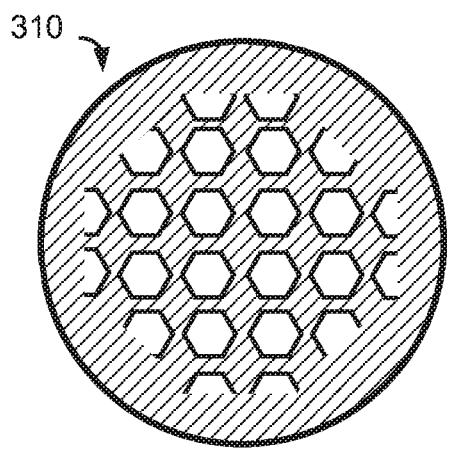
Figure 3D:
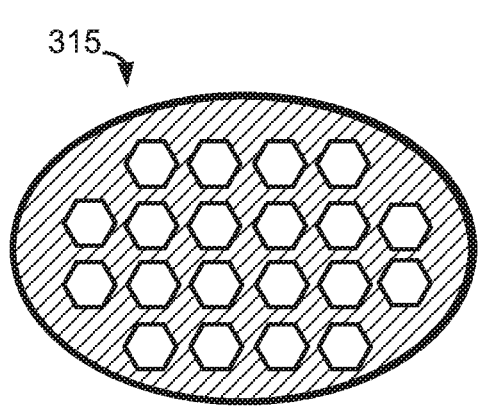
Figure 3E:
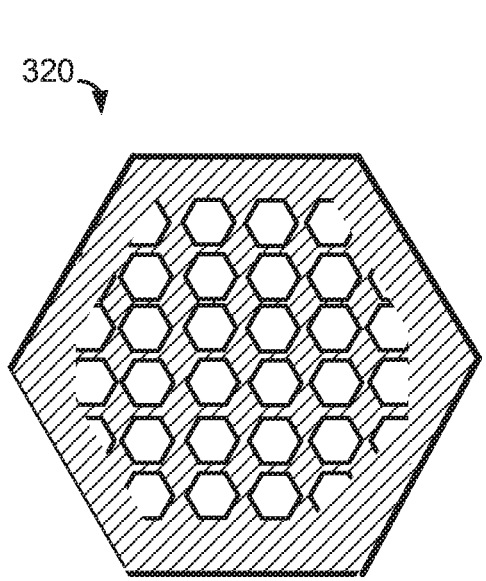
Figure 3F:
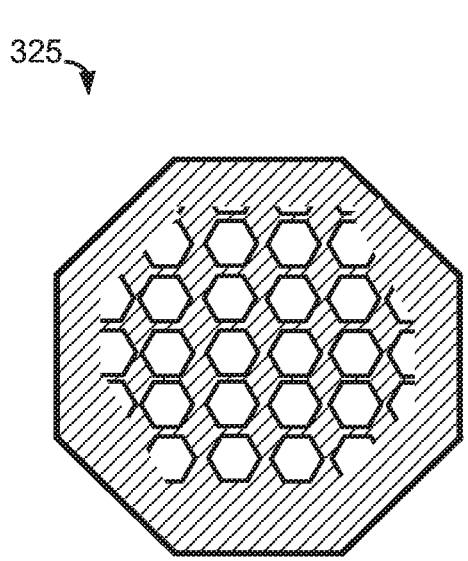

Turning first to FIG. 3A, a first example article 300 is illustrated as having a rectangular cross-sectional shape. As shown, the corners of the article 300 may be rounded, blunted, or truncated. FIG. 3B illustrates a second example article 305 having a square cross-sectional shape with rounded corners. FIG. 3C illustrates a third example article 310 having a circular cross-sectional shape; FIG. 3D illustrates a fourth example article 315 having an elliptical or oval cross-sectional shape; FIG. 3E illustrates a fifth example article 320 having a hexagonal cross-sectional shape; and FIG. 3F illustrates a sixth example article 325 having an octagonal cross-sectional shape. As desired, the corners of an article may be sharp, rounded, blunted, truncated, curved, or otherwise formed. Other cross-sectional shapes may be utilized as desired, and the shapes illustrated in FIGS. 3A-3F are provided by way of non-limiting example only.

As set forth above, an article (e.g., the article 100 of FIG. 1), may include a conductor formed from a wide variety of suitable materials or combinations of materials. A few non-limiting examples of conductors having different material and/or layer constructions are illustrated in FIGS. 4A-4F. For ease of illustration, each of the example conductors is illustrated as a rectangular conductor; however, each conductor may be formed with any suitable cross-sectional shape, such as any of the shapes illustrated in FIGS. 3A-3F. Additionally, each of the conductors is depicted as including one or more cavities having square or rectangular cross-sectional shapes. As desired in various embodiments, any number of cavities and/or configurations of cavities may be incorporated into any of the conductors illustrated in FIGS. 4A-4F. For example, any of the example cavity configurations illustrated in FIGS. 5A-5I may be utilized with any of the conductors of FIGS. 4A-4F.

Figure 4A:
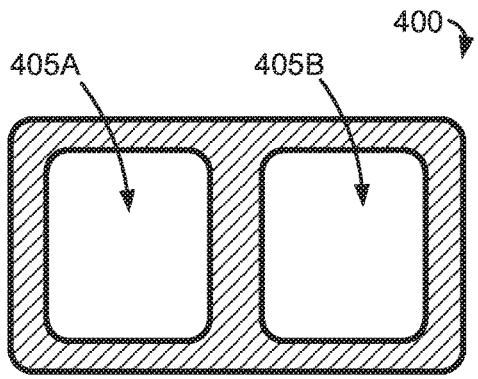
FIGS. 4A-4F illustrate example cross-sectional conductor constructions that may be utilized for magnet wire articles in accordance with various embodiments of the disclosure.
Figure 4B:
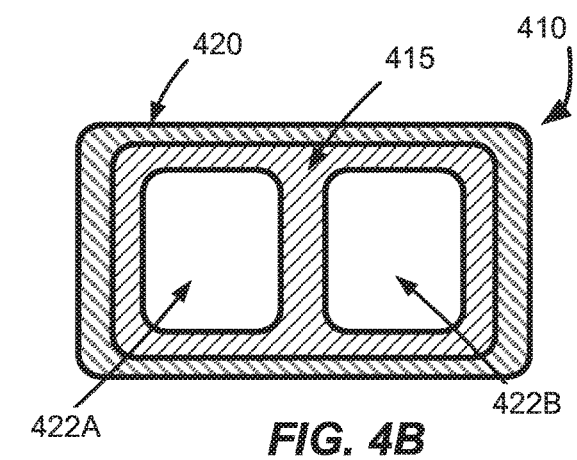

Turning first to FIG. 4A, a first example conductor 400 is illustrated. The conductor 400 may be formed from a single conductive material, such as copper. Additionally, a plurality of cavities may be formed in the conductor 400, such as the two illustrated square cavities 405A, 405B. FIG. 4B illustrates a second example conductor 410 formed from at least two different conductive materials. For example, a first conductive material is utilized to form a conductor core 415, and a second conductive material different from the first conductive material is utilized to form a layer 420 around the core 415. Cavities may be formed in the conductor core 415, such as the two illustrated cavities 425A, 425B.

Figure 4C:
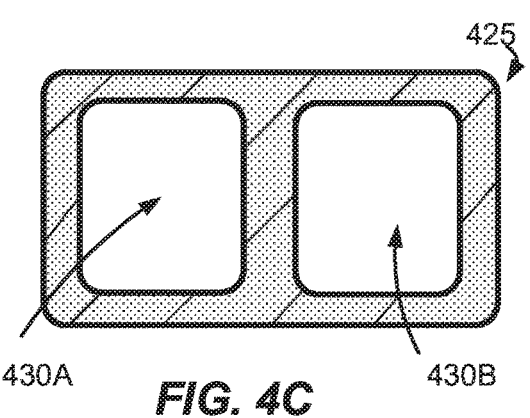
Figure 4D:
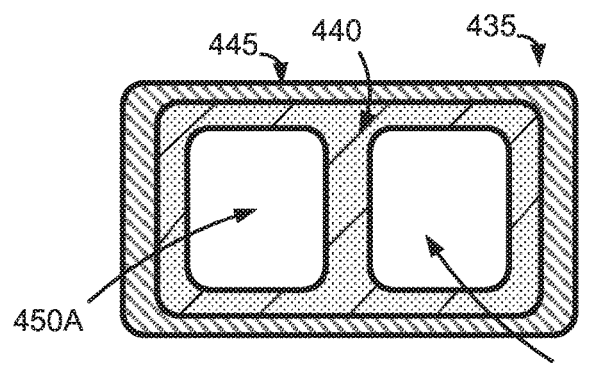
Figure 4E:
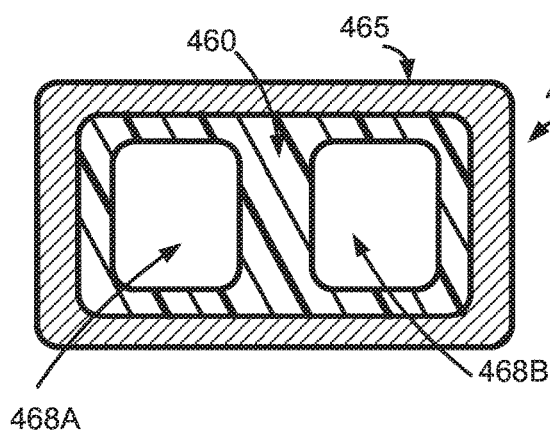

FIG. 4C illustrates a third example conductor 425 formed from carbon nanotubes. Additionally, cavities may be formed in the conductor 400, such as the two illustrated square cavities 430A, 430B. FIG. 4D illustrates a fourth example conductor 435 formed from at least two different materials. For example, a conductive core 440 may be formed from carbon nanotubes, and a second material (e.g., copper, etc.) may be utilized to form a layer 445 around the core 435. Additionally, cavities may be formed in the core 435, such as the two illustrated cavities 450A, 450B. FIG. 4E illustrates a fifth example conductor 455 formed from at least two different materials. For example, a conductor core 460 may be formed from a dielectric material (or a combination of dielectric materials), and a second material (e.g., copper, carbon nanotubes, etc.) may be utilized to form a layer 465 around the core 460. Additionally, cavities may be formed in the core 460, such as the two illustrated cavities 468A, 468B.

Figure 4F:
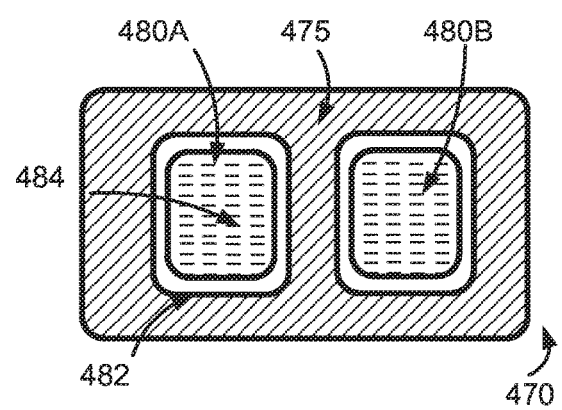

FIG. 4F illustrates a sixth example conductor 470 that includes one or more layers 475 of conductive material (e.g., metal, carbon nanotubes, etc.) with a plurality of cavities 480A, 480B formed in the conductor 470. Additionally, a lining 482 or coating may be formed on a surface of at least one of the cavities (generally referred to as cavity 480). The lining 482 may promote or facilitate use of a cooling fluid or substance that might normally break down or degrade the conductive material 475. The lining 482 may be formed from a wide variety of suitable materials, such as any of the materials described above with reference to FIG. 1. Additionally, a cooling fluid or substance 484 may be positioned within the cavity 480. The cooling fluid or substance 484 may include any suitable material(s), such as one or more of the materials discussed above with reference to FIG. 1. A wide variety of other conductor constructions may be utilized as desired in various embodiments of the disclosure. The constructions illustrated in FIGS. 4A-4F are provided by way of non-limiting example only.

A wide variety of different configurations of cavities may be utilized in various embodiments. A few non-limiting examples of cavity configurations are illustrated in FIGS. 5A-5I. FIGS. 5A-5J illustrate single layer conductors that have either a rectangular (FIGS. 5A-5I) or a circular (FIG. 5J) cross-sectional shape. Conductors may be formed with other suitable cross-sectionals shapes, such as any of the cross-sectional shapes illustrated in FIGS. 3A-3F. Further, any of the cavities illustrated in FIGS. 5A-5I may include a lining and/or a cooling fluid positioned therein.

Figure 5A:
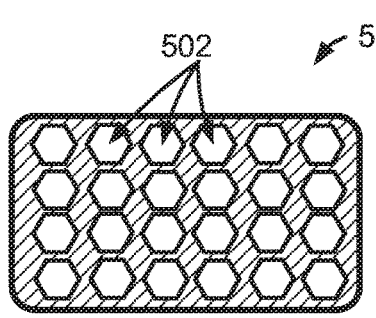
FIGS. 5A-5I illustrate cross-sectional views of example internal cavity configurations that may be incorporated into magnet wire articles in accordance with various embodiments of the disclosure.

Turning first to FIG. 5A, a first example conductor 500 is illustrated that includes a plurality of cavities 502 having hexagonal cross-sectional shapes. Any number of cavities 502 may be formed in the conductor 500. Additionally, the cavities 502 may be arranged in any suitable number of rows, columns, arrays, and/or other configurations. Each of the cavities 502 may have any suitable dimensions, such as any suitable cross-sectional areas, longitudinal lengths, etc.

In certain embodiments, the plurality of cavities 502 may be positioned in a honeycomb configuration.

Figure 5B:
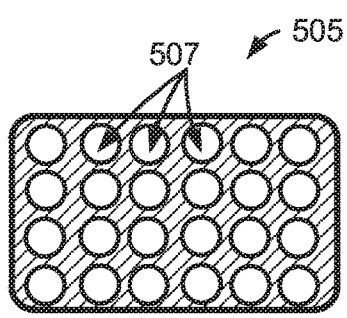
Figure 5C:
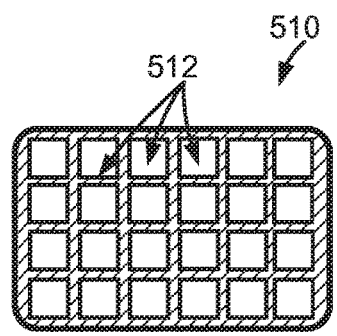

FIG. 5B illustrates a second example conductor 505 that includes a plurality of cavities 507 having circular cross-sectional shapes. Any number of cavities 507 may be formed in the conductor 505, and the cavities 507 may be arranged in any suitable number of rows, columns, arrays, and/or other configurations. Each of the cavities 507 may have any suitable dimensions, such as any suitable diameters, cross-sectional areas, longitudinal lengths, etc. FIG. 5C illustrates a third example conductor 510 that includes a plurality of cavities 512 having square cross-sectional shapes. Any number of cavities 512 may be formed in the conductor 510, and the cavities 512 may be arranged in any suitable number of rows, columns, arrays, and/or other configurations. Each of the cavities 512 may have any suitable dimensions, such as any suitable widths, heights, cross-sectional areas, longitudinal lengths, etc. Although hexagonal, circular, and square cavities are illustrated in FIGS. 5A-5C, other embodiments may include cavities having other suitable cross-sectional shapes, such as elliptical, rectangular, and/or octagonal cross-sectional shapes.

Figure 5D:
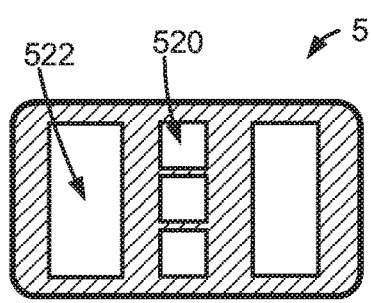

In certain embodiments, a plurality of cavities may be formed in a conductor, and at least two cavities may have different dimensions. FIG. 5D illustrates an example conductor 515 in which a first set of one or more cavities 520 have first dimensions and a second set of one or more cavities 522 have second dimensions different than the first dimensions. As shown, the first set of cavities 520 are formed with square cross-sectional shapes, and the second set of cavities 522 are formed with rectangular cross-sectional shapes. The various cavities 520, 522 may be formed with a wide variety of suitable cross-sectional dimensions and/or longitudinal lengths. In certain embodiments, the cavities 520, 522 with differing dimensions may be arranged in order to provide one or more desired benefits for the conductor 515, such as improved structural support and/or enhanced heat transfer surface area. For example, the arrangement of cavities 520, 522 in FIG. 5D may provide enhanced structural support for the conductor 515.

Any number of dimensions may be varied between at least two cavities in a conductor. For example, two conductors may be formed with different cross-sectional shapes, cross-sectional areas, cross-sectional dimensions (e.g., heights, widths, diameters, etc.), longitudinal lengths, and/or other desired dimensions. Although rectangular and square cavities are illustrated in FIG. 5D, a wide variety of other suitable cavity variations and/or configurations may be utilized.

Figure 5E:
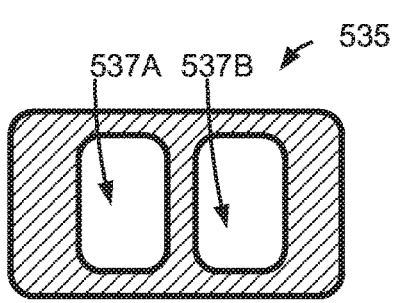
Figure 5F:
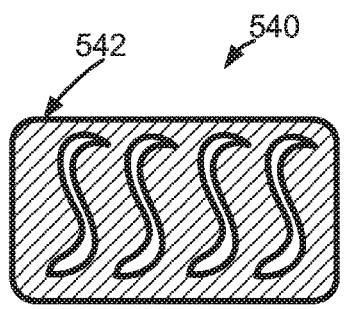

FIG. 5E illustrates an example conductor 535 formed with two cavities 537A, 537B, such as two rectangular cavities. As desired, one or both of the cavities 537A, 537B may include a cavity lining that facilitates circulation of a cooling fluid. FIG. 5F illustrates an example conductor 540 formed with cavities 542 having wavy or serpentine cross-sectional shapes. Indeed, cavities may be formed with any suitable cross-sectional shapes as desired. For example, cavities may be formed with geometric, straight, curved, wavy, serpentine, zig-zag, or any other suitable shape. In certain embodiments, a plurality of cavities may be formed or arranged in accordance with a pattern. In other embodiments, a plurality of cavities may be formed or arranged in a random or pseudo-random manner.

Figure 5G:
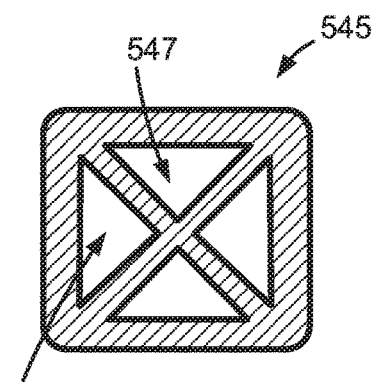
Figure 5H:
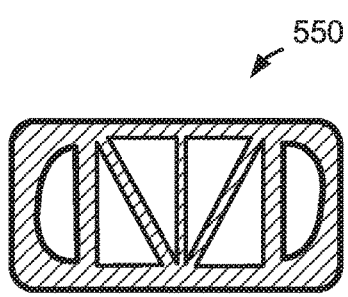
Figure 5I:
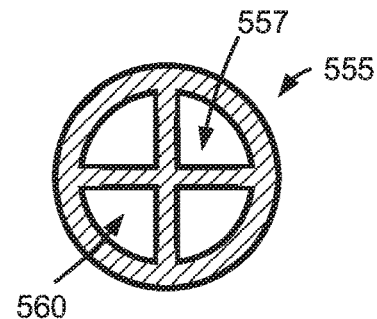

In certain embodiments, a plurality of cavities may be defined by an internal support, lattice, cross-beam, or other structure formed within a conductor. For example, a larger cavity may be subdivided into smaller cavities by one or more internal supports. As another example, a plurality of individual cavities may be defined by a support structure. FIG. 5G illustrates an example rectangular conductor 545 having two diagonal support members that define four cavities 547 having triangular cross-sectional shapes. FIG. 5H illustrates an example rectangular conductor 550 having a lattice or support structure including a combination of vertical and diagonal members, thereby defining a plurality of cavities. FIG. 5I illustrates an example circular conductor 555 including two support members 557, 560 that bisect an internal cavity perpendicular to one another. In other words, the support members 557, 560 form a cross within the conductor 555, and a plurality of cavities are defined within an internal opening. As desired, internal supports and/or other structures may be formed with a wide variety of suitable dimensions (e.g., thicknesses, etc.) and/or in a wide variety of suitable configurations or arrangements.

As set forth above, an article (e.g., any of the articles illustrated in FIGS. 1-5I) may have a desired or predefined shape. In certain embodiments, a magnet wire may be formed, cut into sections with any desired lengths, and the sections of magnet wire may be bent, twisted, and/or otherwise formed into articles with any suitable shapes. In other embodiments, an article may be formed or produced with a desired shape, for example, by additive manufacturing or injection molding. In certain embodiments, an article may include at least one bend that forms or approximately forms an angle. In other embodiments, an article may include one or more twists. Additionally, an article may be formed with a wide variety of suitable shapes. In certain embodiments, articles may be formed as hairpins having a "U" or an approximately "U" shape. For example, an article may have a U-shaped end turn with two legs extending from the end turn. The term "U" shape is not intended to be limiting and may cover a wide variety of shapes including an end turn with legs extending from the end turn, such as a "V" shape or a "W" shape. As desired in various embodiments, the two legs may have either unequal or approximately equal lengths. In other embodiments, an article may be formed to have a waveform shape.

Figure 6:
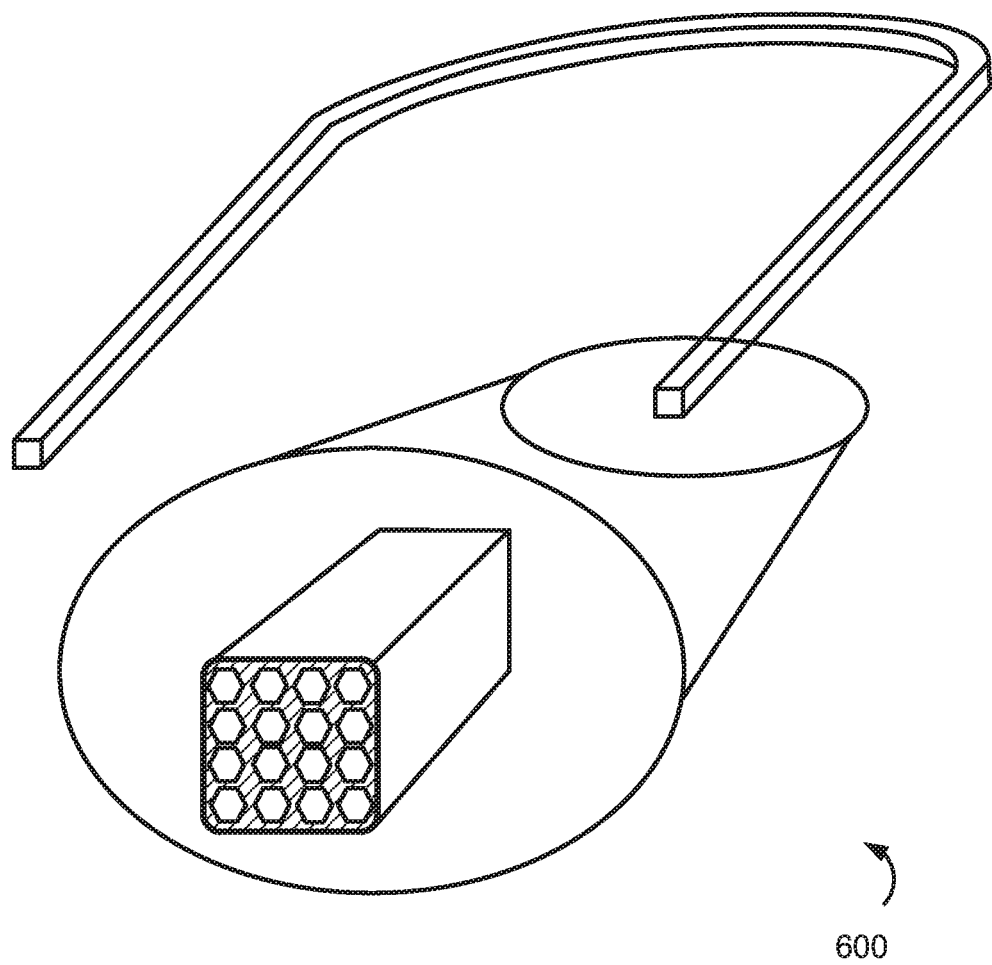
FIGS. 6-9F illustrate example magnet wire articles that include internal cavities in accordance with various embodiments of the disclosure.
Figure 7:
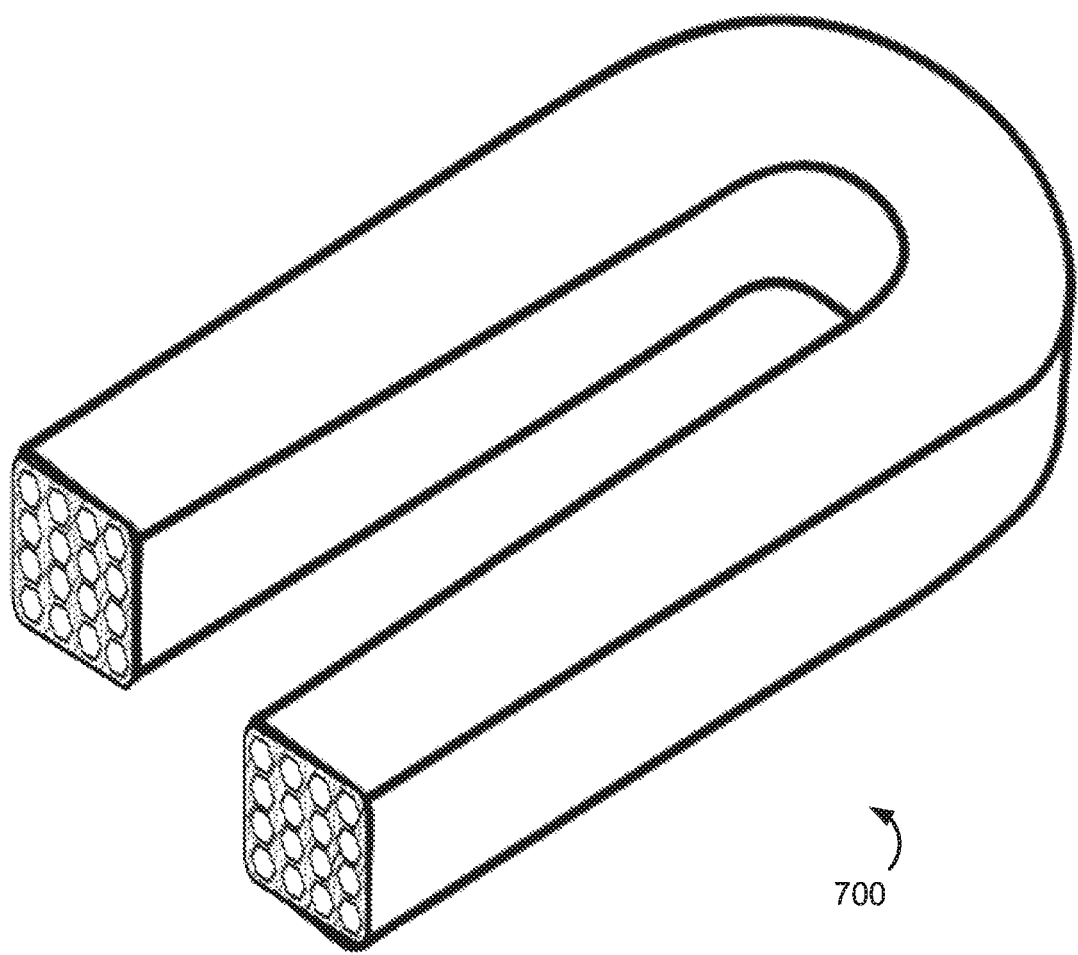
Figure 8:
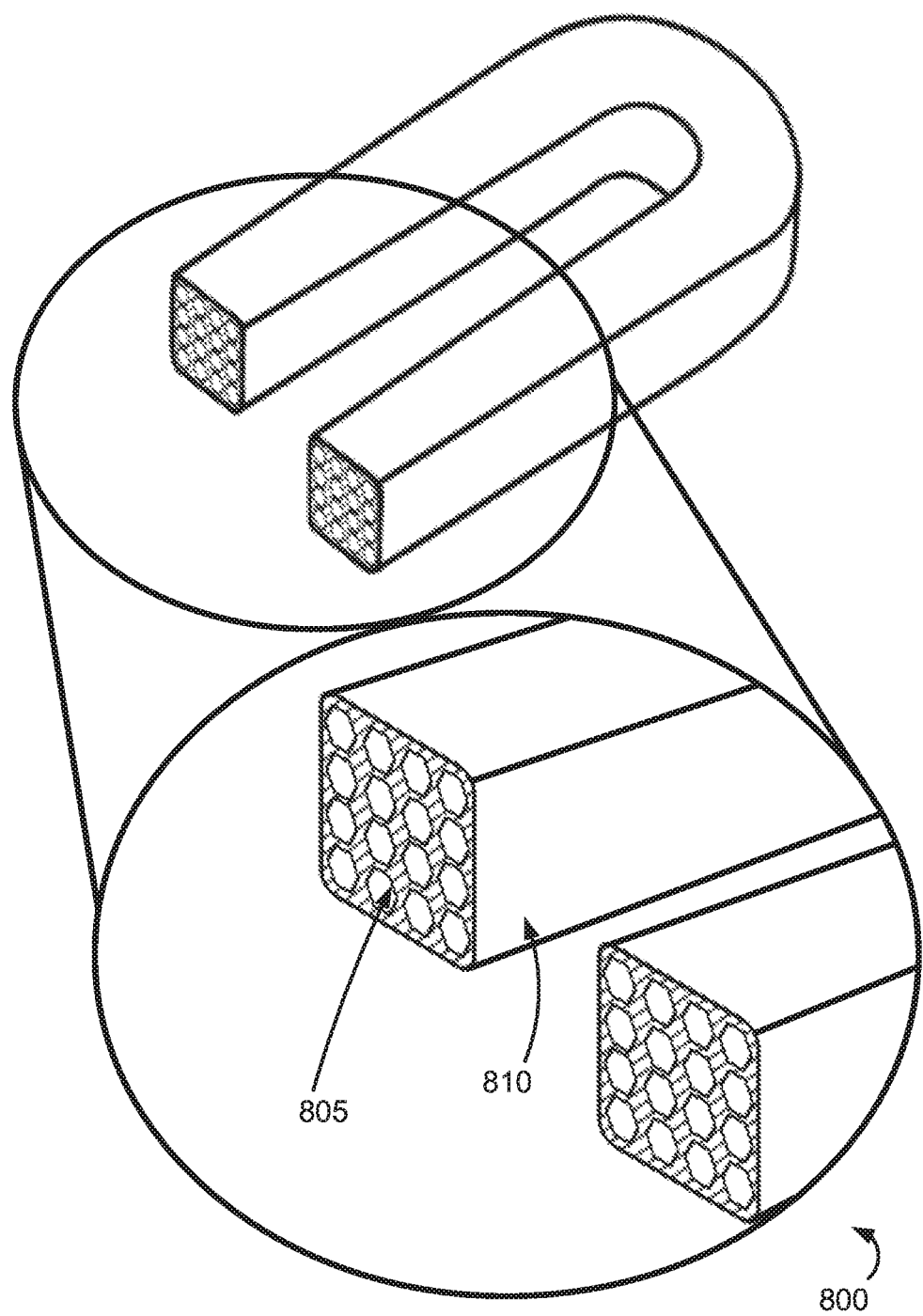

A few example magnet wire articles that include cavities are illustrated in FIGS. 6-9F. FIG. 6 illustrates a first example article 600 formed as a U-shape hairpin. The article 600 may be formed from (e.g., bent, shaped, etc.) or otherwise constructed from (e.g., 3D printed, etc.) any suitable material or combinations of material. For example, the article 600 may be formed from copper or another suitable metallic material. Additionally, a plurality of cavities may be formed in the article 600, as illustrated in the exploded portion of FIG. 6. As set forth above, the cavities may be positioned in a wide variety of suitable arrangements, such as a honeycomb pattern, etc. FIG. 7 illustrates a second example article 700 formed as a U-shaped hairpin with a plurality of cavities. The article 700 may be similar to the article 600 of FIG. 6; however, the article 700 may include a conductor or conductive element formed from carbon nanotubes rather than from a metallic material. FIG. 8 illustrates a third example article 800 formed as a U-shaped hairpin with a plurality of cavities. The article 800 may include a core component 805 surrounded by an outer component 810. For example, the core component 805 may be formed from a metallic material that is surrounded by an outer cladding 810. In various embodiments, the core component 805 and the outer component 810 may be formed from different materials (e.g., different conductive materials, a carbon nanotube core surrounded by a metallic cladding, a dielectric core surrounded by a metallic cladding, etc.).

Additionally, any number of cavities may be formed in the core component 805, such as the illustrated cavities positioned in a honeycomb arrangement.

Figure 9A:
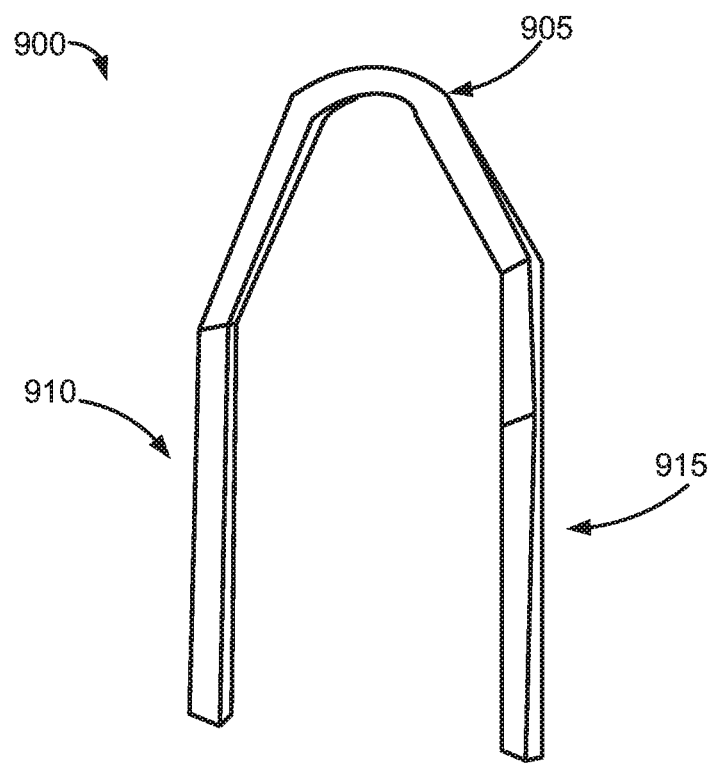
Figure 9B:
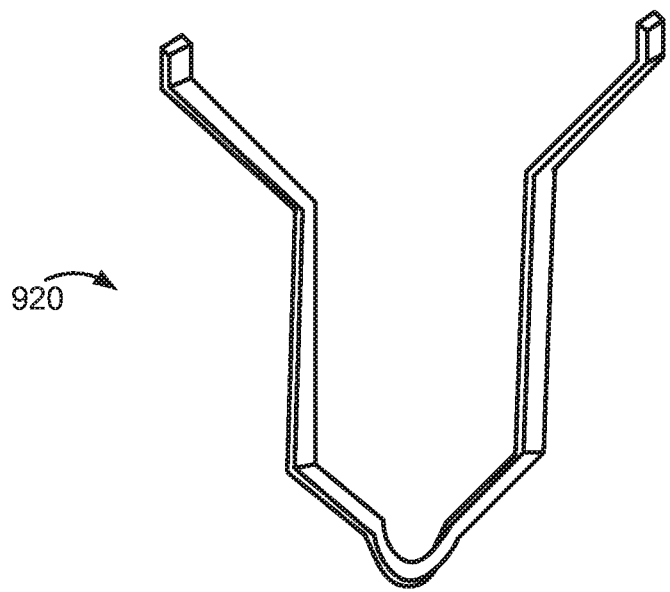
Figure 9C:
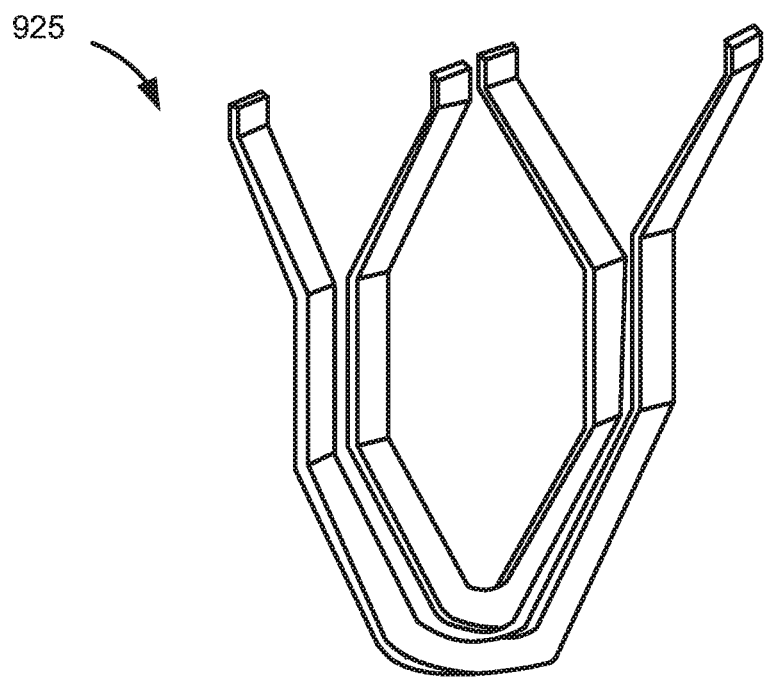
Figure 9D:
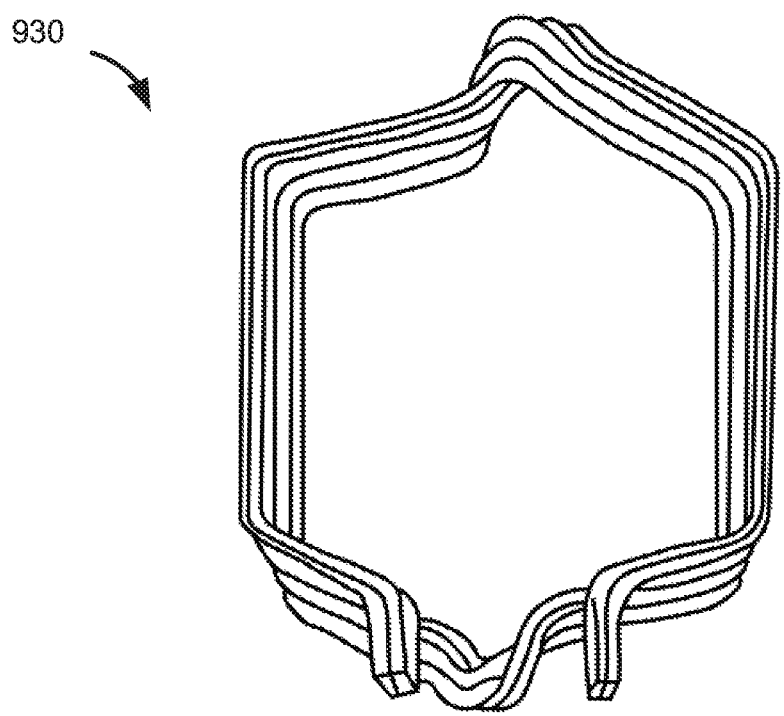
Figure 9E:
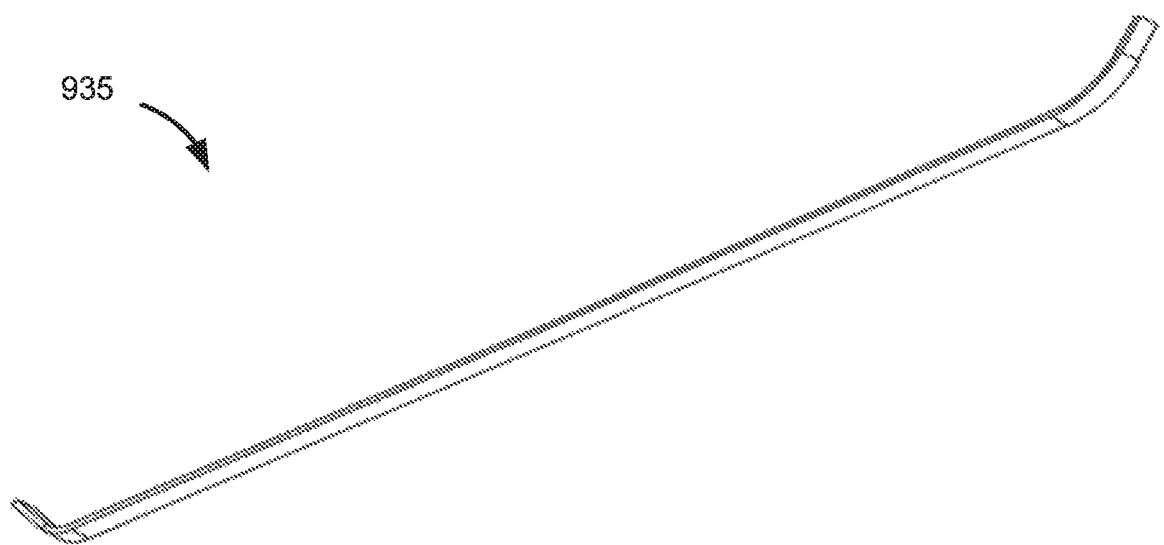
Figure 9F:
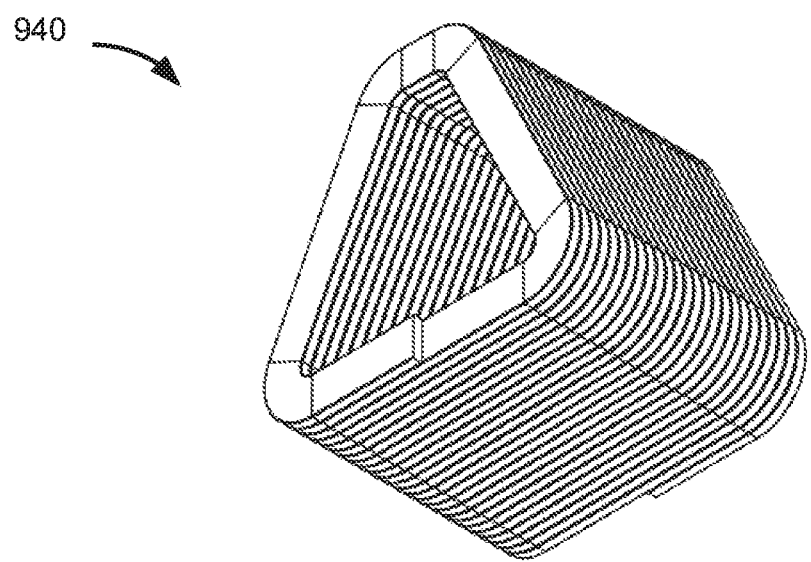

Although FIGS. 6-8 illustrate a few example U-shaped hairpins, a wide variety of suitable hairpins and/or other shaped components may be utilized as magnet wire articles. A few alternative articles are illustrated in FIGS. 9A-9F. FIG. 9A illustrates a first example article 900 that includes a U-shaped end turn 905 and two legs 910, 915 extending from the end turn 905. FIGS. 9B and 9C illustrates other example articles 920, 925 that are formed as U-shaped hairpins. In contrast to the article 900 of FIG. 9A, further bends may be incorporated as desired into one or more of the leg portions of the articles 920, 925 illustrated in FIGS. 9B and 9C. FIG. 9D illustrates an example article 930 that includes one or more twisted ends that form end turns for a winding. FIG. 9E illustrates an example article 935 that includes bent or shaped ends, and that may be utilized as a bar in a winding. FIG. 9F illustrates an example article 940 that includes bends that result in the formation of a coil having an approximately triangular cross-sectional shape. The article 940 may be used, for example, as an axial flux coil. A wide variety of other articles may be formed that include any number of bends and/or twists. The articles discussed with reference to FIGS. 6-9F are provided by way of non-limiting example only.

As set forth in greater detail above, articles may be formed with a wide variety of suitable constructions. For example, articles may include conductors with any number of dimensions, layers, and/or material constructions, such as any of the example conductors illustrated in FIGS. 3A-4F. As another example, articles may include any suitable insulation, such as any of the insulation described above with reference to FIGS. 1-2E. Additionally, a wide variety of cavity configurations may be incorporated into an article, such as any of the configurations described above with reference to FIGS. 5A-5I. Indeed, a wide variety of suitable articles may be formed by selected and/or combining the example constructions and/or configurations described herein.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An insulated winding wire article, comprising:
   a conductor comprising an electrically conductive strand, the conductor formed into a predefined shape comprising at least one bend;
   a plurality of cavities formed within the electrically conductive strand; and
   insulation formed around the conductor.

2. The article of claim 1, wherein the electrically conductive strand comprises at least one of (i) metal or (ii) carbon nanotubes.

3. The article of claim 1, wherein the conductor comprises a central core and an outer layer formed around the central core, wherein the plurality of cavities are formed within the central core.

4. The article of claim 3, wherein the central core comprises a first conductive material and the outer layer comprises a second conductive material different than the first conductive material.

5. The article of claim 3, wherein the central core comprises one of (i) carbon nanotubes or (ii) a dielectric material and the outer layer comprises a metallic material.

6. The article of claim 1, wherein the insulation comprises at least one of (i) enamel, (ii) extruded polymeric material, (iii) semi-conductive material, or (iv) a conformal layer of insulation material.

7. The article of claim 1, wherein the plurality of cavities comprises a plurality of cavities positioned at a cross-sectional location along the article.

8. The article of claim 1, wherein the plurality of cavities comprises a plurality of cavities positioned end to end along a longitudinal length of the article.

9. The article of claim 1, wherein the plurality of cavities comprises a first plurality of cavities positioned end to end along a longitudinal length of the article and a second plurality of cavities positioned at a cross-sectional locational along the article.

10. The article of claim 1, wherein at least one cavity included in the plurality of cavities comprises one of a circular, elliptical, square, rectangular, hexagonal, octagonal, wavy, or sinusoidal cross-sectional shape.

11. The article of any of claim 1, wherein the plurality of cavities comprises a plurality of cavities positioned in a honeycomb arrangement.

12. The article of claim 1, wherein the plurality of cavities comprises a plurality of cavities defined by at least one of (i) one or more spokes, (ii) one or more vertical supports, (iii) one or more crossbeams, or (iv) one or more diagonal supports positioned within the conductor.

13. The article of any claim 1, wherein the plurality of cavities comprises a plurality of cavities positioned in at least one of (i) a row, (ii) a column, (iii) an array, or (iv) a grid.

14. The article of claim 1, wherein the plurality of cavities facilitates circulation of a fluid within the conductor, the fluid comprising one of (i) a gas, (ii) a vapor, (iii) a refrigerant, or (iv) a liquid.

15. The article of claim 1, further comprising a lining formed on a surface of at least one cavity included in the plurality of cavities.

16. The article of claim 15, wherein the lining comprises at least one of (i) a polymer, (ii) epoxy, or (iii) an inorganic compound.

17. The article of claim 15, further comprising at least one of (i) ethylene glycol, (ii) toluene, (iii) propylene glycol, (iv) ammonia, (v) refrigerant, (vi) oil, (vii) alcohol, (viii) hydrogen, (ix) argon, (x) nitrogen, (xi) air, (xii) carbon dioxide, (xiii) supercritical carbon dioxide, (xiv) water, (xv) methane, or (xvi) liquid methane positioned as a coolant within the at least one cavity.

18. The article of claim 1, wherein at least one cavity included in the plurality of cavities has a cross-sectional area between approximately 0.00010 in$^2$ and approximately 24.9 in$^2$.

19. The article of claim 1, wherein the predefined shape comprises a U-shaped hairpin.

20. The article of claim 1, wherein the predefined shape comprises a waveform shape.

21. An insulated winding wire article, comprising:
a conductor comprising an electrically conductive strand, the conductor formed into a predefined shape comprising at least one bend;
at least one cavity formed within the electrically conductive strand and extending along a longitudinal length of the conductor;
a lining comprising at least one of (i) a polymer, (ii) epoxy, or (iii) an inorganic compound formed on a surface of the at least one cavity; and
insulation formed around the conductor.

22. The article of claim 21, wherein the at least one cavity comprises a plurality of cavities formed within the electrically conductive strand.

23. The article of claim 21, wherein the electrically conductive strand comprises at least one of (i) metal or (ii) carbon nanotubes.

24. The article of claim 21, wherein:
the conductor comprises a central core formed from a first conductive material and an outer layer formed around the central core from a second conductive material different than the first conductive material; and
the at least cavity is formed in the central core.

25. The article of claim 21, wherein the insulation comprises at least one of (i) enamel, (ii) extruded polymeric material, or (iv) a conformal layer of insulation material.

26. The article of claim 21, wherein the insulation comprises semi-conductive material.

27. The article of claim 21, wherein the at least one cavity facilitates circulation of a fluid within the conductor, the fluid comprising one of (i) a gas, (ii) a vapor, (iii) a refrigerant, or (iv) a liquid.

28. The article of claim 21, further comprising at least one of (i) ethylene glycol, (ii) toluene, (iii) propylene glycol, (iv) ammonia, (v) refrigerant, (vi) oil, (vii) alcohol, (viii) hydrogen, (ix) argon, (x) nitrogen, (xi) air, (xii) carbon dioxide, (xiii) supercritical carbon dioxide, (xiv) water, (xv) methane, or (xvi) liquid methane positioned as a coolant within the at least one cavity.

29. The article of claim 21, wherein at least one cavity has a cross-sectional area between approximately 0.00010 in$^2$ and approximately 24.9 in$^2$.

30. The article of claim 21, wherein the at least one bend comprises a U-shaped bend.

31. The article of claim 21, wherein the predefined shape comprises a waveform shape.

32. An insulated winding wire article, comprising:
a conductor comprising an electrically conductive strand, the conductor formed into a predefined shape comprising a U-shaped bend;
at least one cavity formed within the electrically conductive strand and extending along a longitudinal length of the conductor; and
insulation formed around the conductor.

33. The article of claim 32, wherein the at least one cavity comprises a plurality of cavities formed within the electrically conductive strand.

34. The article of claim 32, wherein the electrically conductive strand comprises at least one of (i) metal or (ii) carbon nanotubes.

35. The article of claim 32, wherein:
the conductor comprises a central core formed from a first conductive material and an outer layer formed around the central core from a second conductive material different than the first conductive material; and
the at least cavity is formed in the central core.

36. The article of claim 32, wherein the insulation comprises at least one of (i) enamel, (ii) extruded polymeric material, or (iv) a conformal layer of insulation material.

37. The article of claim 32, wherein the insulation comprises semi-conductive material.

38. The article of claim 32, wherein the at least one cavity facilitates circulation of a fluid within the conductor, the fluid comprising one of (i) a gas, (ii) a vapor, (iii) a refrigerant, or (iv) a liquid.

39. The article of claim 32, further comprising at least one of (i) ethylene glycol, (ii) toluene, (iii) propylene glycol, (iv) ammonia, (v) refrigerant, (vi) oil, (vii) alcohol, (viii) hydrogen, (ix) argon, (x) nitrogen, (xi) air, (xii) carbon dioxide, (xiii) supercritical carbon dioxide, (xiv) water, (xv) methane, or (xvi) liquid methane positioned as a coolant within the at least one cavity.

40. The article of claim 32, wherein at least one cavity has a cross-sectional area between approximately 0.00010 in$^2$ and approximately 24.9 in$^2$.

* * * * *